United States Patent
Rigney et al.

(10) Patent No.: US 6,296,447 B1
(45) Date of Patent: Oct. 2, 2001

(54) GAS TURBINE COMPONENT HAVING LOCATION-DEPENDENT PROTECTIVE COATINGS THEREON

(75) Inventors: Joseph D. Rigney, Milford; Bangalore A. Nagaraj, West Chester; Jeffrey A. Pfaendtner, Blue Ash, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/373,270

(22) Filed: Aug. 11, 1999

(51) Int. Cl.[7] ........................................ F01D 5/14
(52) U.S. Cl. ............................. 416/241 R; 415/217.1
(58) Field of Search ............................ 415/200, 217.1; 416/193 A, 224, 229 A, 230, 241 A, 241 B, 241 R; 427/181, 182, 237, 252, 454; 428/469, 472, 632

(56) References Cited

U.S. PATENT DOCUMENTS

| | | | |
|---|---|---|---|
| 4,087,589 | * | 5/1978 | Bessen ................................ 428/596 |
| 4,390,320 | * | 6/1983 | Eiswerth ........................... 416/97 R |
| 4,978,558 | * | 12/1990 | Lamm ................................ 427/250 |
| 5,225,246 | * | 7/1993 | Beers et al. ......................... 427/252 |
| 5,238,752 | * | 8/1993 | Duderstadt et al. .................. 428/623 |
| 5,514,482 | * | 5/1996 | Strangman ........................... 428/623 |
| 5,928,725 | * | 7/1999 | Howard et al. ...................... 427/237 |
| 5,967,755 | | 10/1999 | Czech et al. ....................... 416/241 R |
| 6,045,863 | * | 4/2000 | Olson et al. ........................ 427/253 |

FOREIGN PATENT DOCUMENTS

| | | |
|---|---|---|
| 457538A1 | 11/1991 | (EP) . |
| 761386A1 | 3/1997 | (EP) . |
| 844368A1 | 5/1998 | (EP) . |

\* cited by examiner

*Primary Examiner*—Edward K. Look
*Assistant Examiner*—Ninh Nguyen
(74) *Attorney, Agent, or Firm*—Andrew C. Hess; David L. Narciso

(57) ABSTRACT

A gas turbine component includes a platform having a first coating on at least a portion thereof, where the first coating is a diffusion aluminide coating. An airfoil extends from the platform and has an external surface and an internal surface defining cooling passages therethrough. The airfoil has an airfoil shape made of a substrate alloy, a second coating on the external surface of the airfoil shape, the second coating comprising an overlay coating, and a third coating on the internal surface of the airfoil shape, the third coating comprising a diffusion aluminide coating different in composition from the second coating.

20 Claims, 3 Drawing Sheets

US 6,296,447 B1

GAS TURBINE COMPONENT HAVING LOCATION-DEPENDENT PROTECTIVE COATINGS THEREON

FIELD OF THE INVENTION

This invention relates to aircraft gas turbine engines, and, more particularly, to protective coatings placed on turbine components such as turbine blades and turbine vanes.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2100° F.

Many approaches have been used to increase the operating temperature limit of the turbine blades and vanes to their current levels. For example, the composition and processing of the base materials themselves have been improved.

Physical cooling techniques may also be used. In one technique, internal cooling passages through the interior of the turbine airfoil are present. Air is forced through the cooling passages and out openings at the external surface of the airfoil, removing heat from the interior of the airfoil and, in some cases, providing a boundary layer of cooler air at the surface of the airfoil. In another approach, a protective layer or a metal/ceramic thermal barrier coating (TBC) system is applied to the airfoil, which acts as a substrate.

The gas turbine blade or vane is operated in a highly aggressive environment that can cause damage to the component in service. The environmental damage may be in various forms, such as particle erosion, different types of corrosion, and oxidation, and complex combinations of these damage modes, in the hot combustion gas environment. The rate of environmental damage may be lessened somewhat with the use of the protective layers. However, the various types of environmental damage are still observed, often necessitating premature replacement or repair of components after service exposure.

There is a need for an improved approach to the protection of gas turbine components such as turbine blades and vanes. The present invention fulfills this need, and further provides related advantages.

BRIEF SUMMARY OF THE INVENTION

This invention provides a gas turbine component that is protected against environmental damage in different locations by different types of protective layers and coatings. The invention recognizes that different regions of the surfaces of the turbine components experience different types of degradation due to the environment, even though the different regions may be separated by a matter of inches or less. The understanding of the performance of different protective layers has progressed to the point that various protective layers may be optimized for performance under these different conditions of environmental damage. However, at this point no one type of protective layer is optimal for use in all or even a wide range of situations. The protective layer for use in each location is selected according to its performance in the service environment experienced at each location and the ability to apply the protective layers in those regions.

A gas turbine component comprises a platform having a first coating on at least a portion thereof, and an airfoil extending from the platform. The airfoil has an external surface and an internal surface defining cooling passages therethrough. The airfoil comprises an airfoil shape comprising a substrate alloy, a second coating on the external surface of the airfoil shape, the second coating being different in composition from the first coating, and a third coating on the internal surface of the airfoil shape, the third coating being different in composition from the second coating, and, preferably, from the first coating as well. The gas turbine component may also have a tip cap remote from the platform with the same composition as the substrate alloy, or fabricated primarily with another oxidation-resistant nickel-base superalloy. A fourth coating may overlie the tip cap.

At least a portion of the platform, preferably its underside remote from the airfoil, is coated with the first coating. As used herein, "coating" encompasses all operable types of protective layers, including for example diffusion coatings, overlay coatings, and thermal barrier coatings using bond coats. The platform runs cooler than the airfoil portion of the component and is exposed to less than the full velocity of the hot gas stream. Corrosion of the platform is a greater concern than oxidation and erosion. The first coating is therefore preferably optimized for corrosion resistance. The first coating is preferably a modified diffusion aluminide comprising aluminum and an element selected from the group consisting of chromium, hafnium, silicon, zirconium, yttrium, platinum, and palladium, and combinations thereof, first applied to the surface of the substrate and then interdiffused with the substrate alloy.

At least a portion of the external surface of the airfoil is coated with the second coating that is preferably optimized for performance in an oxidation and erosion environment, and, in the case of thermal barrier coating applications, additionally optimized for thermal insulation. The second coating is preferably an MCrAlX overlay coating. M refers to nickel, cobalt, iron, and combinations thereof. Cr refers to chromium, although in some of these protective coatings the chromium may be omitted. Al refers to aluminum. The X denotes elements such as hafnium, zirconium, yttrium, tantalum, rhenium, platinum, silicon, titanium, boron, carbon, and combinations thereof. The second coating may instead be a diffusion aluminide, to which is added noble metals, rare earth elements, chromium, and/or other elements or phases which increase the strength of the second coating. In either case, a ceramic layer is optionally applied overlying the metallic or intermetallic coating to form a thermal barrier coating (TBC).

Different regions of the external surface of the airfoil may be coated with different coatings. The second coating just described is typically used on a concave pressure side of the airfoil, against which the hot combustion gas directly impinges. A different coating may be used on a convex suction side (i.e., back side) of the airfoil. This portion of the airfoil operates at nearly the same temperature as the pressure side, but is less affected by hot erosion. The substrate alloy still requires protection from the environment, and specifically oxidation and hot corrosion caused by the hot combustion gas. Aerodynamic and fluid-dynamic considerations indicate that the corrosive deposits are less likely to deposit on the convex suction side of the airfoil and are more likely to stick to the concave pressure side of the airfoil. As a result, the protective coating applied on the surface of the suction side of the airfoil need not be as environmentally resistant as the protective coating on the pressure side. For example, a diffusion aluminide similar to that described above as the first coating may be used on the surface of the suction side of the airfoil.

The internal surfaces of the airfoil, defined by internal cooling passages through the airfoil, are coated with an oxidation-resistant third coating material. The demands on this third coating are less severe than those made on the other coatings, because the interior surfaces do not experience as aggressive an environment. However, it is more difficult to achieve coating of the internal surfaces. The third coating is therefore preferably a relatively simple diffusion aluminide which may be readily applied. In some situations, it may be advantageous to introduce elements such as hafnium, zirconium, yttrium, tantalum, titanium, rhenium, platinum, palladium, silicon, and combinations thereof into the third coating to improve its performance.

The tip cap region experiences various types of environmental damage, depending upon the application. The fourth coating, where used, may be of the same composition and type as any of the first, second, or third coatings, or of another type.

The use of different coatings on different surface regions allows the selection of optimal coatings for each of the different environmental exposures and types of degradation expected for the different surface regions. The present approach allows the selection and application of coatings which provide the best overall performance in each specific application. Techniques are available for applying the different types of coatings in a compatible manner, sometimes simultaneously and in other situations sequentially. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
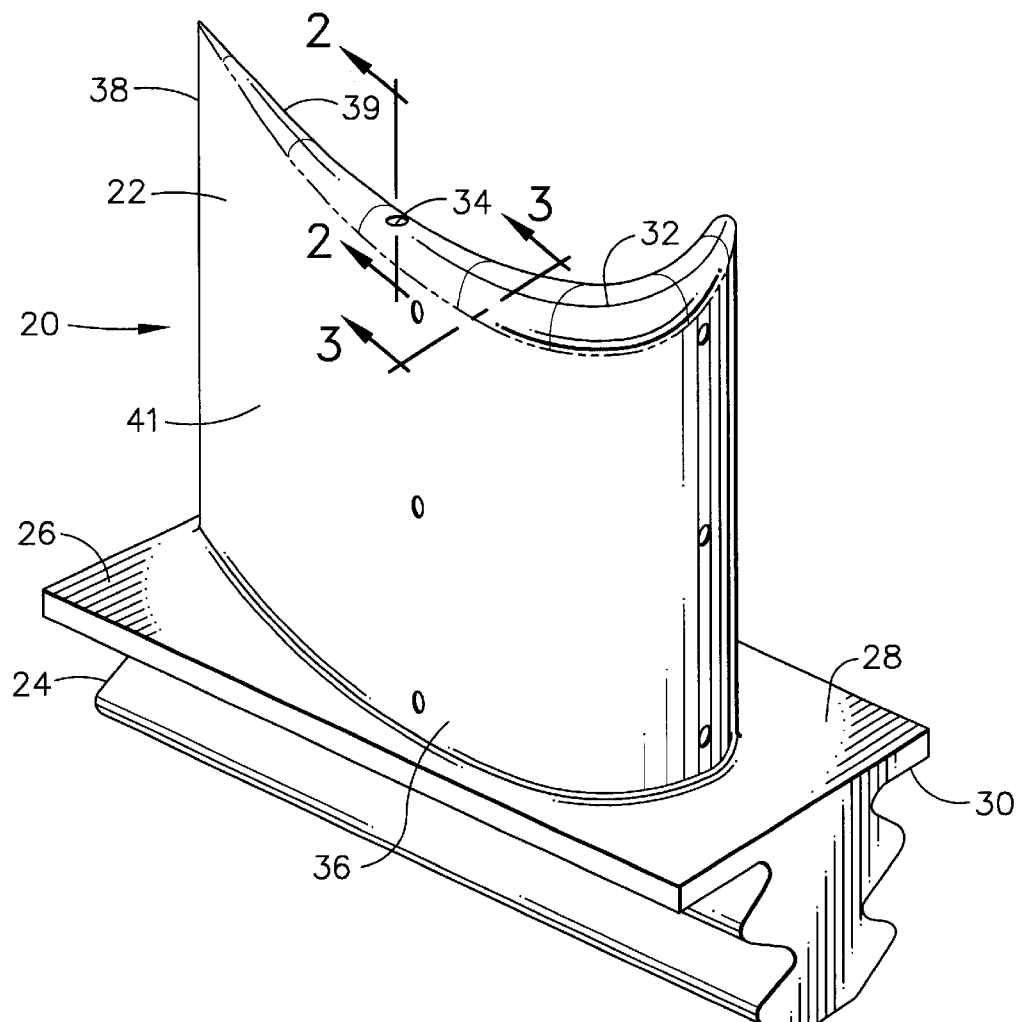
FIG. 1 is a perspective view of a turbine blade.

FIG. 1 depicts a component article of a gas turbine engine such as a turbine blade or turbine vane, and in this illustration a turbine blade 20. The turbine blade 20 is formed of any operable material, but is preferably a nickel-base superalloy. The body of the turbine blade serves as a substrate for the coatings that are described subsequently. The turbine blade 20 includes an airfoil 22 against which the flow of hot exhaust gas is directed. (The turbine vane has a similar appearance in respect to the pertinent portions.) The turbine blade 20 is mounted to a turbine disk (not shown) by a dovetail 24 which extends downwardly from the airfoil 22 and engages a slot on the turbine disk.

A platform 26 extends longitudinally outwardly from the area where the airfoil 22 is joined to the dovetail 24, so that the airfoil 22 extends upwardly from the platform 26. The platform has a top side 28 adjacent to the airfoil 22 and an underside 30 remote from the airfoil 22 and adjacent to the dovetail 24.

The airfoil 22 may terminate in a tip cap 32 at a location remote from the platform 26. The tip cap 32 may be made of the same material as the airfoil 22. The tip cap 32 may be a different material than the airfoil 22, such as a nickel-base superalloy of a different composition than the airfoil 22 and applied by welding during fabrication or repair of the component.

A number of internal passages extend through the interior of the airfoil 22, ending in openings 34 in the surface of the airfoil 22. A flow of cooling air is directed through the internal passages, to reduce the temperature of the airfoil 22.

The airfoil 22 may be described as having a root end 36 adjacent to the dovetail 24, and an oppositely disposed tip end 38 remote from the dovetail 24. The airfoil 22 may also be described as having a pressure side 39, which is concavely shaped and is sometimes known as the "high-pressure side"; and a suction side 41, which is convexly shaped and is sometimes known as the "low-pressure side" or "back side". In service, the hot combustion gas is directed against the pressure side 39.

Figure 2:
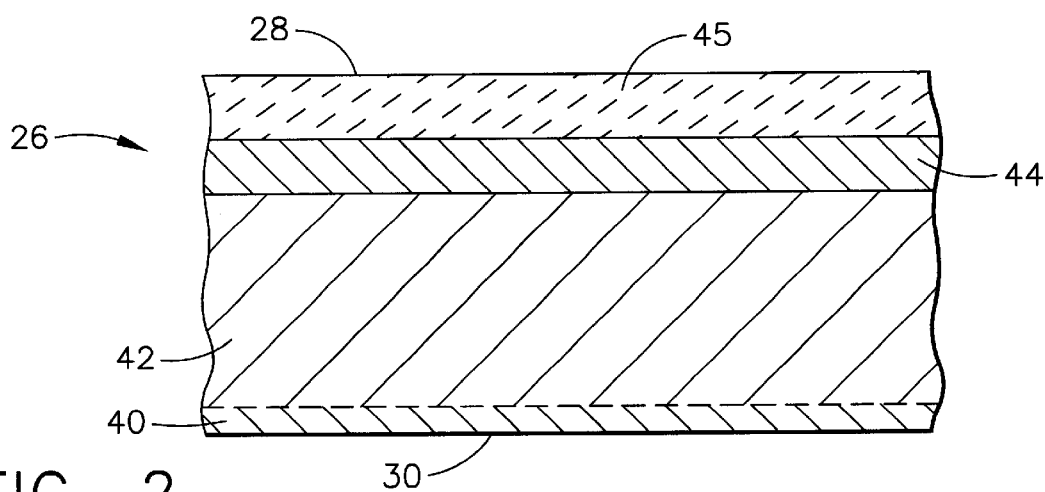
FIG. 2 is an enlarged schematic sectional view through the turbine blade of FIG. 1, taken on lines 2—2.

FIG. 2 is a section through the platform 26. A first coating 40 is applied to at least a portion of the platform 26. In this case, the first coating 40 is applied to the underside 30 of the platform 26. The first coating 40 is optimized for performance in the environment experienced by the underside 30 of the platform. In the case of most interest to the inventors, the environment experienced by the underside 30 of the platform 26 is primarily a corrosive atmosphere at an intermediate temperature of from about 900° F. to about 1700° F. That is, the underside 30 of the platform 26 is not subjected to the higher temperature oxidative and erosive environment experienced by the pressure side 39 of the airfoil 22. To withstand this intermediate-temperature primarily corrosive environment, the first coating 40 is preferably a modified diffusion aluminide coating. The preferred modified diffusion aluminide coating 40 preferably comprises aluminum modified by the addition of the following elements to improve corrosion resistance: chromium, hafnium, silicon, zirconium, yttrium, platinum, and palladium, and combinations thereof. The modifying element is present in an effective amount. Typical amounts of the modifying elements that are present, either alone or in combination in compatible compositions, include, in weight percent, from about 2 to about 50 percent chromium, from about 0.1 to about 20 percent hafnium, from about 0.1 to about 10 percent silicon, from about 0.1 to about 5 percent zirconium, from about 0.1 to about 5 percent yttrium, from about 0.1 to about 50 percent palladium, and from about 0.1 to about 50 percent platinum. The aluminum and the corrosion-improving modifying element are interdiffused with the metal of the substrate 42, rather than being present as an overlay coating. The first coating 40 is preferably from about 0.0005 inch to about 0.005 inch thick. The aluminum and modifying elements are deposited by any operable technique, such as vapor deposition or chemical vapor deposition at about 1800–2100° F., so that a layer about 0.002 inch thick is deposited in 4–16 hours. The aluminum and modifying elements interdiffuse into the superalloy substrate at this temperature, producing the diffusion aluminide coating. In the case of a platinum diffusion aluminide coating, the platinum is typically deposited by electrodeposition, followed by deposition of the aluminum-containing layer. The first coating 40 may instead be an overlay coating of the type discussed subsequently in relation to the second coating, but of a different composition.

A wide variety of operable techniques are known for depositing aluminide coatings, including, for example, pack cementation, above-the-pack, chemical vapor deposition, overlay processing, slurry, thermal spray, electron beam physical vapor deposition, sputter, cathodic arc, or ion plasma techniques. A low-temperature slurry process operating at about 1400–1650° F. may be employed, which is particularly useful for repaired hardware which previously did not have any coating under the platform. Yet another operable technique is entrapment plating. In this technique, an alloy, elemental powders, or a combination are deposited on the surface, such as by an electroplating technique. It is easy to mask the serrated regions of the dovetail 24 prior to entrapment plating. Interdiffusion of the deposited material with the substrate may be accomplished by a diffusion heat treatment, or an aluminiding cycle may be required to increase the final aluminum content.

Another coating 44 may be present on the other parts of the platform 26, here the top side 28. The coating 44 may be the same coating as the first coating 40, if the top side 28 is subjected to substantially the same environment as the underside 30. More commonly, the coating 44 would be the same as the second coating to be described subsequently, as it experiences the impingement of hot gases in the flow path. A ceramic thermal barrier coating layer 45, such as will be described subsequently, may optionally be applied overlying the coating 44.

Figure 3:
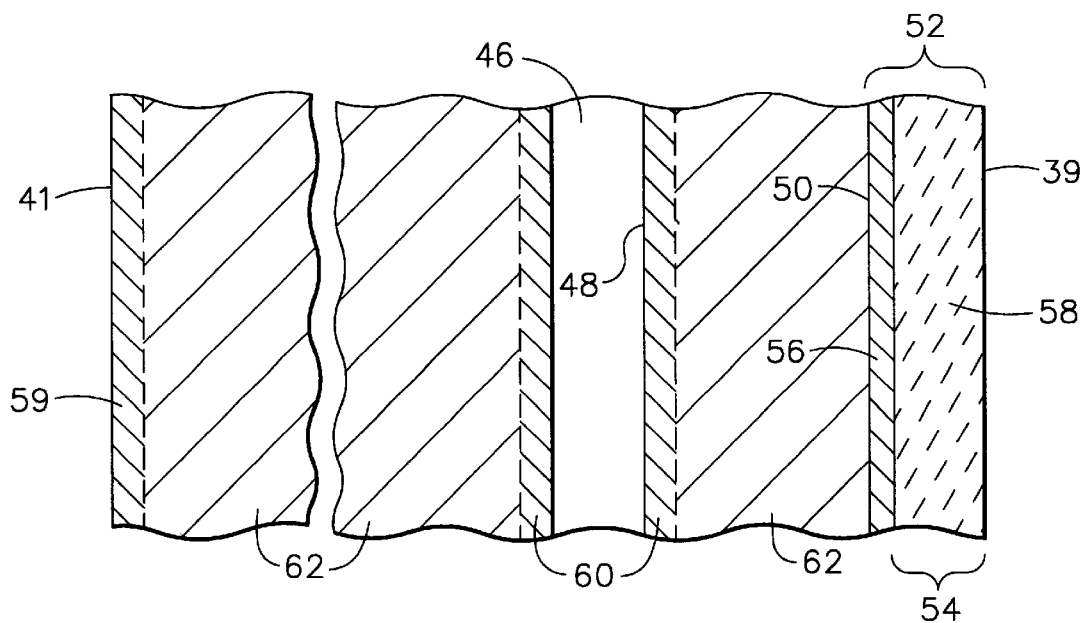
FIG. 3 is an enlarged schematic sectional view through the turbine blade of FIG. 1, taken on lines 3—3.

FIG. 3 is a longitudinal section through the airfoil 22, showing one of the internal passages 46 extending through an interior of the airfoil 22. The internal passage 46 has an internal airfoil surface 48, and there is also an external airfoil surface 50 of the metallic substrate portion of the airfoil 22.

The pressure side 39 of the external airfoil surface 50 is protected by a second coating 52, illustrated in FIG. 3, which is different in composition from the first coating 40. In this case, the second coating 52 is optimized for the high-temperature, oxidative, and corrosive environment experienced by the external airfoil surface 50. The preferred second coating 52 comprises an overlay protective coating 54 overlying and contacting the external airfoil surface 50. The overlay protective coating 54 has a protective layer 56 overlying and contacting the external airfoil surface 50. The protective layer 56 is preferably formed of an MCrAlX composition. The terminology "MCrAlX" is a shorthand term of art for a variety of families of overlay protective layers 56 that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, platinum, silicon, titanium, boron, carbon, and combinations thereof. Specific compositions are known in the art. Two examples of MCrAlX compositions include, for example, NiAlZr or NiCrAlZr, but this listing is not to be taken as limiting. The protective layer 56 is from about 0.0005 to about 0.005 inch thick. Such protective layers 56 are known in the art. The protective layer 56 is deposited by any operable process, typically by physical vapor deposition, sputtering, cathodic arc, or thermal spray of powders. Although the protective layer 56 is preferably of an MCrAlX composition, it may be a modified diffusion aluminide, but of a different, more protective, composition from the first coating 40.

Preferably, where the overlay protective coating 54 of the MCrAlX type is used, there is very little or no diffusion aluminide material present on the external airfoil surface 50. It has sometimes been the practice in the past to deposit an aluminum layer on the external airfoil surface 50, prior to depositing the MCrAlX protective layer 56. That is not preferred with the present invention, and in fact care is taken so that substantially no aluminum is deposited on the external airfoil surface 50 prior to depositing the MCrAlX protective layer 56.

Optionally, a ceramic layer 58 overlies and contacts the protective layer 56. The ceramic layer 58 is preferably yttria-stabilized zirconia, which is zirconium oxide containing from about 2 to about 12 weight percent, preferably from about 3 to about 8 weight percent, of yttrium oxide. The ceramic layer 58 is typically from about 0.003 to about 0.010 inch thick. Other operable ceramic materials and thicknesses may be used as well. When there is no ceramic layer 58 present, the protective layer 56 is termed an "environmental coating". When there is a ceramic layer 58 present, the protective layer 56 is termed a "bond coat". The ceramic layer 58 is deposited by any operable approach, with physical vapor deposition and powder spray being preferred.

Different coatings may be used on different portions of the external surface of the airfoil 22, and an example is illustrated in FIG. 3. In the example, the second coating 52 is applied on the pressure side 39 of the airfoil, as discussed above. A different coating 59 is applied on the suction side 41 of the airfoil 22, which has different protective requirements from the pressure side 39 as discussed earlier. The coating 59 may be of any operable type, but typically is an overlay coating or modified diffusion aluminide of the types discussed earlier. There may or may not be a ceramic layer overlying the coating 59.

The internal airfoil surface 48 is protected by a third coating 60 at the surface of each of the internal passages 46, illustrated in FIG. 3. The third coating 60 has a composition that is different from that of the protective layer 56 and preferably, but not necessarily, different from that of the first coating 40. The third coating 60 is selected to protect the internal airfoil surface 48 against the environmental conditions that it experiences. The internal passages 46 conduct bleed compressor air through the interior of the airfoil 22 to cool it. The internal airfoil surface 48 is therefore not subjected to extensive hot corrosion degradation, and is at a lower temperature than the external airfoil surface 50. The third coating 60 is therefore preferably a simple diffusion aluminide coating formed by depositing aluminum onto the internal airfoil surface 48, so that a body of the airfoil 22 serves as a substrate 62. The aluminum is interdiffused with the material of the substrate 62 to form an aluminum-enriched protective region lying below the internal airfoil surface 48. The third coating 60 has a composition with the aluminum concentration highest near the internal airfoil surface 48, and decreasing aluminum concentration with increasing distance into the substrate 62 from the internal airfoil surface 48. The third coating optionally contains elements that further improve its oxidation resistance. The third coating 60 is typically from about 0.0005 to about 0.003 inch thick. The aluminum-enriched region at the internal airfoil surface 36 later oxidizes to form a highly adherent aluminum oxide protective scale at the internal airfoil surface 36, slowing subsequent oxidation damage. An overlay coating is not used on the internal airfoil surface 48. The third coating 60 is deposited by any operable approach, preferably a slurry process, pack cementation, above-the-pack deposition, or vapor deposition such as chemical vapor deposition.

Figure 4:
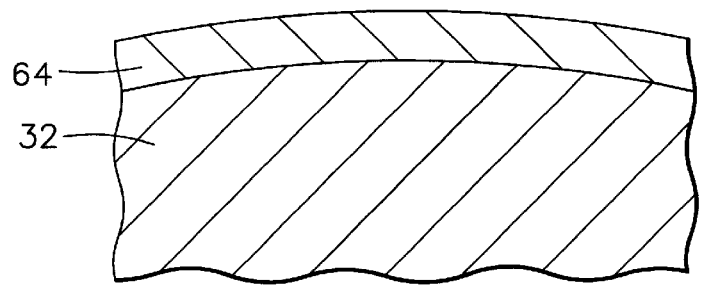
FIG. 4 is an enlarged schematic sectional view through the turbine blade of FIG. 1, taken on lines 4—4.

The tip cap 32 may be protected by a fourth coating 64, illustrated in FIG. 4. The fourth coating 64 protects the tip cap 32 against the environmental damage experienced by the tip cap 32, which environmental damage depends upon the nature and positioning of the article and the operating conditions of the gas turbine engine. The fourth coating 64 may be of any of the compositions and types of the first coating 40, the second coating 52, or the third coating 60, or it may be of any other operable type, and deposited by any operable process appropriate to the selected coating type.

Figure 5:
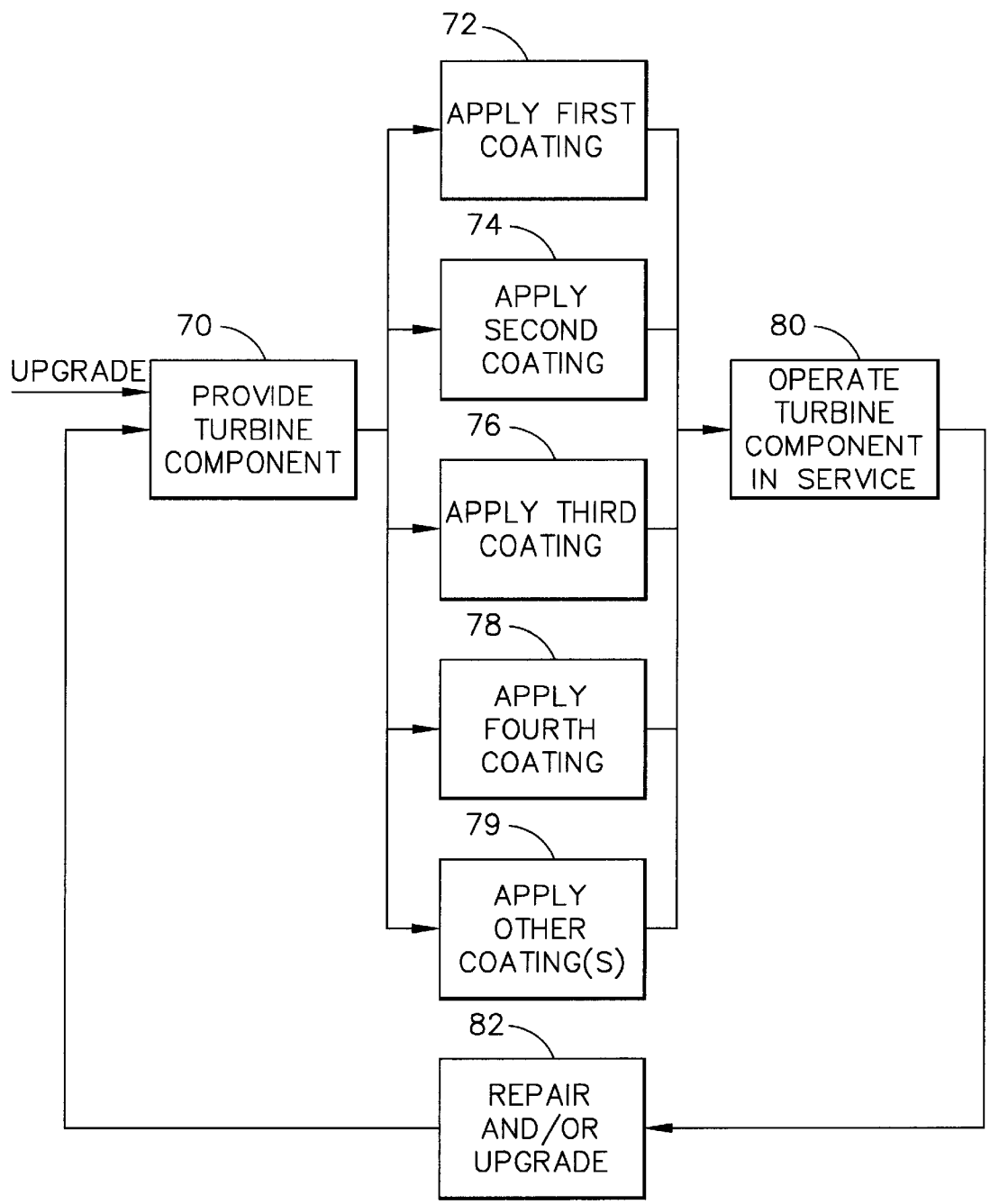
FIG. 5 is a block flow diagram of an approach for preparing a coated gas turbine airfoil.

FIG. 5 is a block diagram of an approach for practicing the present invention. A turbine component is provided, numeral 70. The turbine component is preferably the turbine blade 20 of FIG. 1. The turbine component may be made of any operable material, with a nickel-base superalloy being preferred. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.01 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene' 142, which has a nominal composition in weight percent of about 6.8 percent chromium, about 12.0 percent cobalt, about 1.5 percent molybdenum, about 2.8 percent rhenium, about 1.5 percent hafnium, about 6.15 percent aluminum, about 4.9 percent tungsten, about 6.35 percent tantalum, about 150 parts per million boron, about 0.12 percent carbon, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to turbine components made of these preferred alloys, and has broader applicability.

The coatings are applied in their respective locations. Specifically, the first coating 40 is applied, numeral 72; the protective layer 56 of the second coating 52 is applied, numeral 74; the third coating 60 is applied, numeral 76; and optionally the fourth coating 64 is applied, numeral 78. The other coatings 44 and 59, where used, are also applied during these operations, numeral 79. Typically, all metallic or intermetallic coatings are first applied, and thereafter any ceramic coatings, such as the ceramic layer 58, are applied. FIG. 5 illustrates the application of the coating in a general form, without an indication of whether the coatings are applied at the same time or sequentially. The determination of the order of application of the coatings depends upon the selected coatings and the application techniques. If, for example, the protective layer 56 of the second coating 52 and the fourth coating 64 are the same composition and are applied by the same deposition technique, it may be possible to apply them at the same time. Typically, the second coating 52, preferably an overlay coating applied by different techniques than the diffusion aluminide coatings, is not applied at the same time as the diffusion aluminide coatings. If the second coating 52 includes the ceramic layer 58, the step 74 will include deposition of the ceramic layer 58 after all of the metallic and/or intermetallic coatings are applied. If one portion of the turbine component is to be coated and the others not coated in a particular operation, the portions that are not to be coated may be masked to prevent undesired deposition. An important feature of the present invention is not the manner or the order in which the coatings are deposited, but the selection and optimization of the coatings according to the performance requirements of specific locations on the turbine component.

After coating is completed, the turbine component is placed into an engine and operated in the service environment, numeral 80. Some degradation of the airfoil dimensions and/or coatings occurs with continued service, and eventually inspection will reveal that one or another of the dimensions and/or coatings has degraded. The turbine component is then removed from service and repaired as indicated by path 82. The repair operation includes cleaning, stripping old coatings where appropriate, restoring dimensions as needed, and applying new coatings. In a repair operation, some of the coatings may not require refurbishment or be possible to refurbish, while others do require refurbishment. For example, the third coating 60 typically seldom if ever requires a repair, so step 76 would not be performed in a repair. On the other hand, the second coating 52 will almost always require repair, and step 74 will usually be performed after the damaged old second coating is stripped away. "Repair" is used here in a broad sense, to include both repairs to damage of the substrate dimensions and coatings and also upgrades by the addition of new protective coatings that were not present on the original article. Upgrades may also be performed on turbine components that were not previously or otherwise processed by the present approach. Such an upgrade repair may further increase the life of the turbine component.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A gas turbine component, comprising:
   a platform having a first coating on at least a portion thereof; and
   an airfoil extending from the platform, the airfoil having an external surface and an internal surface defining cooling passages therethrough, the airfoil comprising an airfoil shape comprising a substrate alloy,
      a second coating on the external surface of the airfoil shape, the second coating being different in composition from the first coating, and
      a third coating on the internal surface of the airfoil shape, the third coating being different in composition from the second coating.

2. The gas turbine component of claim 1, wherein the first coating comprises a diffusion aluminide coating.

3. The gas turbine component of claim 1, wherein the first coating comprises an overlay coating.

4. The gas turbine component of claim 1, wherein the first coating comprises aluminum and an element selected from the group consisting of chromium, hafnium, silicon, zirconium, yttrium, platinum, and palladium.

5. The gas turbine component of claim 1, wherein the first coating is on an underside of the platform remote from the airfoil.

6. The gas turbine component of claim 1, wherein the second coating comprises an overlay coating.

7. The gas turbine component of claim 1, wherein the second coating comprises an MCrAlX overlay coating.

8. The gas turbine component of claim 1, wherein the second coating comprises a diffusion aluminide coating.

9. The gas turbine component of claim 1, wherein the second coating comprises a thermal barrier coating including a ceramic layer.

10. The gas turbine component of claim 1, wherein the third coating comprises a diffusion aluminide coating.

11. The gas turbine component of claim 1, wherein the airfoil includes
    a tip cap remote from the platform, and
    a fourth coating overlying the tip cap.

12. The gas turbine component of claim 11, wherein the fourth coating has substantially the same composition as one of the first coating, the second coating, and the third coating.

13. The gas turbine component of claim 11, wherein the fourth coating has a composition different from those of the first coating, the second coating, and the third coating.

14. The gas turbine component of claim 1, wherein the third coating is different in composition from the first coating.

15. A gas turbine component, comprising:
    a platform having a first coating on at least a portion of an underside thereof, wherein the first coating comprises a platform coating selected from the group consisting of a platform diffusion aluminide coating and a platform overlay coating; and
    an airfoil extending from the platform, the airfoil having an external surface and an internal surface defining cooling passages therethrough, the airfoil comprising
       an airfoil shape comprising a substrate alloy, the underside of the platform being remote from the airfoil shape,
       a second coating on the external surface of the airfoil shape, the second coating comprising an airfoil coating selected from the group consisting of an airfoil overlay coating and an airfoil diffusion aluminide coating, and
       a third coating on the internal surface of the airfoil shape, the third coating comprising an internal diffusion aluminide coating different in composition from the first coating.

16. The gas turbine component of claim 15, wherein the third coating is different in composition from the second coating.

17. A gas turbine component, comprising:
    a platform having a first coating on at least a portion thereof; and
    an airfoil extending from the platform, the airfoil having an external surface and an internal surface defining cooling passages therethrough, the airfoil comprising an airfoil shape comprising a substrate alloy,
       a second coating on the external surface of the airfoil shape, the second coating being different in composition from the first coating, and
       a third coating on the internal surface of the airfoil shape, the third coating being different in composition from the first coating.

18. The gas turbine component of claim 17, wherein the first coating is on an underside of the platform remote from the airfoil.

19. The gas turbine component of claim 17, wherein the gas turbine component is a turbine blade.

20. The gas turbine component of claim 1, wherein the gas turbine component is a turbine blade.

* * * * *